(12) United States Patent
Chen et al.

(10) Patent No.: US 11,828,961 B2
(45) Date of Patent: Nov. 28, 2023

(54) OPTICAL FILTER AND INFRARED IMAGE SENSING SYSTEM INCLUDING THE SAME

(71) Applicant: XINYANG SUNNY OPTICS CO., LTD., Xinyang (CN)

(72) Inventors: Ce Chen, Xinyang (CN); Weihong Ding, Xinyang (CN); Niangong Xiao, Xinyang (CN); Jili Chen, Xinyang (CN)

(73) Assignee: XINYANG SUNNY OPTICS CO., LTD., Xinyang (CN)

( * ) Notice: Subject to any disclaimer, the term of this patent is extended or adjusted under 35 U.S.C. 154(b) by 96 days.

(21) Appl. No.: 16/767,423

(22) PCT Filed: Mar. 12, 2019

(86) PCT No.: PCT/CN2019/077849
§ 371 (c)(1),
(2) Date: May 27, 2020

(87) PCT Pub. No.: WO2020/029579
PCT Pub. Date: Feb. 13, 2020

(65) Prior Publication Data
US 2020/0393601 A1    Dec. 17, 2020

(30) Foreign Application Priority Data

Aug. 6, 2018   (CN) .......................... 201810884048.1

(51) Int. Cl.
*B32B 15/04*    (2006.01)
*B32B 17/06*    (2006.01)
(Continued)

(52) U.S. Cl.
CPC .......... *G02B 5/208* (2013.01); *C03C 17/3482* (2013.01); *G02B 1/115* (2013.01);
(Continued)

(58) Field of Classification Search
CPC ................................................ C03C 2217/734
(Continued)

(56) References Cited

U.S. PATENT DOCUMENTS 8,668,990 B2 * 3/2014 Broadway ........... C03C 17/3423
428/428
8,693,097 B2 * 4/2014 Broadway .............. G02B 1/115
359/582

(Continued)

FOREIGN PATENT DOCUMENTS

CN    203287553 U    11/2013
CN    105911625 A    8/2016
(Continued)

OTHER PUBLICATIONS

Filmetrics, SiO, 2023.*
(Continued)

*Primary Examiner* — Lauren R Colgan
(74) *Attorney, Agent, or Firm* — Dragon Sun Law Firm, PC; Nathaniel Perkins (57) ABSTRACT

The present disclosure relates to an optical filter and an infrared image sensing system including the optical filter. The optical filter includes a glass substrate, and an IR film layer and an AR film layer plated on two opposite surfaces of the glass substrate; the IR film layer includes a first refractive-index-material layer, a second refractive-index-material layer, and a third refractive-index-material layer; the refractive index of the third refractive-index-material layer is greater than the refractive index of the first refractive-index-material layer, and the refractive index of the second refractive-index-material layer is greater than the refractive index of the third refractive-index-material layer. The optical filter of the present disclosure has a good anti-reflection effect on near-infrared light so that a high (Continued)

accuracy of face recognition and gesture recognition is ensured.

16 Claims, 4 Drawing Sheets

(51) Int. Cl.
    *G02B 5/20*           (2006.01)
    *C03C 17/34*         (2006.01)
    *G02B 1/115*        (2015.01)
    *H04N 5/33*         (2023.01)
    *G02B 5/28*          (2006.01)

(52) U.S. Cl.
    CPC ............ *G02B 5/281* (2013.01); *G02B 5/285* (2013.01); *H04N 5/33* (2013.01); *C03C 2217/213* (2013.01); *C03C 2217/214* (2013.01); *C03C 2217/734* (2013.01); *C03C 2218/155* (2013.01); *G02B 5/288* (2013.01)

(58) Field of Classification Search
    USPC .......................................... 428/426, 428, 432
    See application file for complete search history.

(56) References Cited

U.S. PATENT DOCUMENTS

| | | | | |
|---|---|---|---|---|
| 9,835,779 | B2* | 12/2017 | Tatemura | G02B 5/285 |
| 9,977,160 | B1 | 5/2018 | Stenger et al. | |
| 10,481,413 | B2* | 11/2019 | Höfener | G02B 1/113 |
| 11,073,639 | B2* | 7/2021 | Wang | G02B 5/223 |
| 11,314,004 | B2* | 4/2022 | Chen | G02B 5/281 |
| 11,480,720 | B2* | 10/2022 | Tsou | G02B 5/282 |
| 2007/0030569 | A1* | 2/2007 | Lu | C03C 17/3435 359/586 |
| 2012/0057236 | A1* | 3/2012 | Broadway | G02B 1/115 359/586 |
| 2014/0091419 | A1* | 4/2014 | Hasegawa | G02B 13/005 359/359 |
| 2016/0238759 | A1* | 8/2016 | Sprague | C23C 14/14 |
| 2017/0276846 | A1 | 9/2017 | Ishido et al. | |
| 2017/0336544 | A1* | 11/2017 | Hendrix | G02B 1/11 |
| 2018/0057398 | A1* | 3/2018 | Broadway | G02B 1/115 |
| 2018/0067338 | A1* | 3/2018 | Höfener | G02B 1/116 |
| 2018/0136380 | A1 | 5/2018 | Tatemura | |
| 2019/0317249 | A1* | 10/2019 | Wang | G03B 11/00 |
| 2020/0209448 | A1* | 7/2020 | Rowlands | C23C 28/00 |
| 2020/0319386 | A1* | 10/2020 | Chen | H01J 37/3426 |
| 2021/0255377 | A1* | 8/2021 | Liu | C23C 14/3464 |

FOREIGN PATENT DOCUMENTS

| | | |
|---|---|---|
| CN | 206638842 U | 11/2017 |
| CN | 108897085 A | 11/2018 |
| CN | 208421291 U | 1/2019 |
| EP | 1701182 A1 | 9/2006 |
| EP | 3330753 A | 6/2018 |
| JP | 63113501 A | 5/1988 |
| WO | 2011033984 A1 | 3/2011 |
| WO | 2014104370 A1 | 7/2014 |
| WO | 2016118919 A1 | 7/2016 |
| WO | 2018043500 A1 | 3/2018 |
| WO | 2020139841 A2 | 7/2020 |

OTHER PUBLICATIONS refractiveindex.info, SiO2, 2023.*
refractiveindex.info, MgF2, 2023.*
International Search Report of PCT/CN2019/077849.
Written Opinion of PCT/CN2019/077849.

* cited by examiner

OPTICAL FILTER AND INFRARED IMAGE SENSING SYSTEM INCLUDING THE SAME

CROSS-REFERENCE TO RELATED PATENT APPLICATION

This application is a national stage application of PCT Application No. PCT/CN2019/077849. This Application claims priority from PCT Application No. PCT/CN2019/077849 filed Mar. 12, 2019, CN Application No. CN 201810884048.1 filed Aug. 6, 2018, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

FIELD OF THE INVENTION

The present disclosure belongs to the technical field of optical sensing, and in particular relates to an optical filter and an infrared image sensing system including the optical filter.

BACKGROUND

With the development of science and technology, functions such as face recognition and gesture recognition are gradually incorporated into terminals such as smartphones, on-vehicle lidars, security access control, smart home, virtual reality/augmented reality/mixed reality, 3D somatosensory games, 3D shooting and displaying.

In the face recognition and gesture recognition, a near-infrared narrow-band optical filter is required, which can anti-reflect near-infrared light in the passband and cut off visible light in the environment. Generally, the near-infrared narrow-band optical filter includes two film systems, namely an IR band-pass film system and a longwave-pass AR film system. However, the anti-reflection effect on near-infrared light and the cut-off effect on visible light of the optical filter in the related art are poor. At the same time, there are problems that the thickness of film layer in the film system is thick and the adhesion of the film layer is poor. As such, when the optical filter is assembled into devices such as for face recognition and gesture recognition, the imaging effect is poor and the recognition accuracy is not high.

Therefore, a heretofore unaddressed need exists in the art to address the aforementioned deficiencies and inadequacies.

SUMMARY OF THE INVENTION

The object of the present disclosure is to provide an optical filter and an infrared image sensing system including the optical filter, which solve the problems of poor anti-reflection effect on near-infrared light and poor adhesion of film layer in existing optical filters.

In order to achieve the above object, the present disclosure provides an optical filter, which includes a glass substrate, and an IR film layer and an AR film layer plated on two opposite surfaces of the glass substrate; wherein the IR film layer includes a first refractive-index-material layer, a second refractive-index-material layer, and a third refractive-index-material layer; and the refractive index of the third refractive-index-material layer is greater than the refractive index of the first refractive-index-material layer, and the refractive index of the second refractive-index-material layer is greater than the refractive index of the third refractive-index-material layer.

According to an aspect of the present disclosure, the AR film layer includes a first refractive-index-material layer and a second refractive-index-material layer, or includes a first refractive-index-material layer, a second refractive-index-material layer, and a third refractive-index-material layer.

According to an aspect of the present disclosure, when viewed in a direction away from the glass substrate, an outermost layer of the IR film layer and an outermost layer of the AR film layer are both the first refractive-index-material layer.

According to an aspect of the present disclosure, when viewed in a direction away from the glass substrate, compositions of the IR film layer are M, (LH)*n and L in sequence, wherein M represents the third refractive-index-material layer, L represents the first refractive-index-material layer, H represents the second refractive-index-material layer, (LH)*n represents that the first refractive-index-material layer and the second refractive-index-material layer are alternately disposed for n times, and n is an integer greater than or equal to 1.

According to an aspect of the present disclosure, when viewed in a direction away from the glass substrate, compositions of the IR film layer are (LH)*s, L, M, (LH)*p and L in sequence, wherein M represents the third refractive-index-material layer, L represents the first refractive-index-material layer, H represents the second refractive-index-material layer, (LH)*s represents that the first refractive-index-material layer and the second refractive-index-material layer are alternately disposed for s times, s is an integer greater than or equal to 0, (LH)*p represents that the first refractive-index-material layer and the second refractive-index-material layer are alternately disposed for p times, and p is an integer greater than or equal to 1.

According to an aspect of the present disclosure, when viewed in a direction away from the glass substrate, compositions of the AR film layer are (LH)*q and L in sequence, wherein L represents the first refractive-index-material layer, H represents the second refractive-index-material layer, (LH)*q represents that the first refractive-index-material layer and the second refractive-index-material layer are alternately disposed for q times, and q is an integer greater than or equal to 1.

According to an aspect of the present disclosure, when viewed in a direction away from the glass substrate, compositions of the AR film layer are M, (LH)*k and L in sequence, wherein M represents the third refractive-index-material layer, L represents the first refractive-index-material layer, H represents the second refractive-index-material layer, (LH)*k represents that the first refractive-index-material layer and the second refractive-index-material layer are alternately disposed for k times, and k is an integer greater than or equal to 1.

According to an aspect of the present disclosure, when viewed in a direction away from the glass substrate, compositions of the AR film layer are (LH)*i, L, M, (LH)*f and L in sequence, wherein M represents the third refractive-index-material layer, L represents the first refractive-index-material layer, H represents the second refractive-index-material layer, (LH)*i represents that the first refractiveindex-material layer and the second refractive-index-material layer are alternately disposed for i times, i is an integer greater than or equal to 0, (LH)*f represents that the first refractive-index-material layer and the second refractive-index-material layer are alternately disposed for f times, and f is an integer greater than or equal to 1.

According to an aspect of the present disclosure, a physical thickness of the second refractive-index-material layer and a physical thickness of the first refractive-index-material layer satisfy a relationship: $0.05 \leq D_L/D_H \leq 20$ and a physical thickness of the third refractive-index-material layer and the physical thickness of the second refractive-index-material layer satisfy a relationship: $0.02 \leq D_M/D_H \leq 50$.

According to an aspect of the present disclosure, the second refractive-index-material layer of the IR film layer is a silicon hydride layer, the refractive index in a wavelength range of 800-1200 nm is greater than 3.5, and an extinction coefficient is less than 0.002; and the second refractive-index-material layer has a refractive index greater than 3.6 at 850 nm and a refractive index greater than 3.55 at 940 nm.

According to an aspect of the present disclosure, the silicon hydride layer is a sputtering reaction plated material layer, wherein a sputtering temperature range is 80-300° C., a hydrogen flow rate is 10-50 sccm, and a sputtering rate is 0.1 nm/s-1 nm/s.

According to an aspect of the present disclosure, in a wavelength range of 800-1200 nm, the refractive index of the third refractive-index-material layer is less than 4, and the refractive index of the first refractive-index-material layer is less than 3.

According to an aspect of the present disclosure, the IR film layer has one pass-band wave band, two cut-off wave bands, and two transition wave bands in a wavelength range of 800-1200 nm, wherein the two transition wave bands are located on two sides of the pass-band wave band respectively, and the two cut-off wave bands are located on an outer side of the two transition wave bands respectively; the pass-band wave band has a width less than 400 nm, and a transmittance greater than 90%; the transition wave bands have a transmittance of 0.1%-90%; and the cut-off wave bands have a transmittance less than 0.1%.

According to an aspect of the present disclosure, the AR film layer has one pass-band wave band, one cut-off wave band, and one transition wave band in a wavelength range of 350-1200 nm, and the cut-off wave band, the transition wave band and the pass-band wave band are arranged in sequence in a direction from 350 nm to 1200 nm; the pass-band wave band has a transmittance greater than 90%; the transition wave band has a transmittance of 0.1%-90%; and the cut-off wave band has a transmittance less than 0.1%.

According to an aspect of the present disclosure, a full width at half maximum (FWHM) value of the optical filter is less than 120 nm, and a total thickness of the IR film layer and the AR film layer is less than 9.8 µm.

According to an aspect of the present disclosure, when an incident angle is changed from 0° to 30°, a shift amount of central wavelength of the passband of the optical filter is less than 20 nm.

In order to achieve the above object, the present disclosure provides an infrared image sensing system including the above described optical filter, which has a light source unit and a receiving unit, the light source unit includes an IR emission light source and a first lens assembly; and the receiving unit includes a second lens assembly, an optical filter, and an infrared image sensor.

According to a solution of the present disclosure, in a case that the IR film layer and the AR film layer are disposed in the manner described above, at the same time of effectively ensuring a high transmittance of near-infrared light, a shift amount of the central wavelength of the passband of the optical filter with angle can be controlled below 20 nm. In addition, since third refractive-index-material layers M are disposed in the IR film layer and the AR film layer and arranged according to the manner described above, the total thickness of the film layers of the optical filter of the present disclosure is effectively reduced, and at the same time, adhesion of the film layers can be improved.

According to a solution of the present disclosure, the present disclosure provides an infrared image sensing system including the optical filter of the present disclosure. Since the optical filter of the present disclosure is provided, near-infrared light can be anti-reflected and light in other wave bands can be cut off when shooting, thereby improving the accuracy of final face recognition and gesture recognition.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

Meanings of the signs in the drawings are explained as follows:

1: glass substrate; 2: IR film layer; 3: AR film layer; L: low-refractive-index-material layer; M: medium-refractive-index-material layer; H: high-refractive-index-material layer; 4: light source unit; 41: IR light source; 42: first lens assembly; 5: receiving unit; 51: second lens assembly; 52: optical filter; 53: infrared image sensor; 6: face/hand.

DETAILED DESCRIPTION OF THE INVENTION

In order to more clearly illustrate the embodiments of the present disclosure or the technical solutions in the related art, drawings required to be used in the embodiments will be briefly described below. Obviously, the drawings in the following description show only some of the embodiments of the present disclosure, and those skilled in the art can obtain other drawings based on these drawings without creative efforts.

When describing the embodiments of the present disclosure, the orientations or positional relationships described by the terms "longitudinal", "transverse", "upper", "lower", "front", "rear", "left", "right", "vertical", "horizontal", "top", "bottom", "inner" and "outer" are based on the orientations or positional relationships shown in the related drawings. These terms are merely used for the sake of facilitating describing the present disclosure and simplifying the description, and do not indicate or imply that the device or element as referred to must have a particular orientation, or must be constructed or operated in a particular orientation. Therefore, the above terms should not be construed as limiting the scope of the present disclosure.

The present disclosure will be described in detail below with reference to the drawings and specific embodiments. It is impossible to describe all the embodiments exhaustively herein, but the embodiments of the present disclosure are not limited to those described below.

Figure 1:
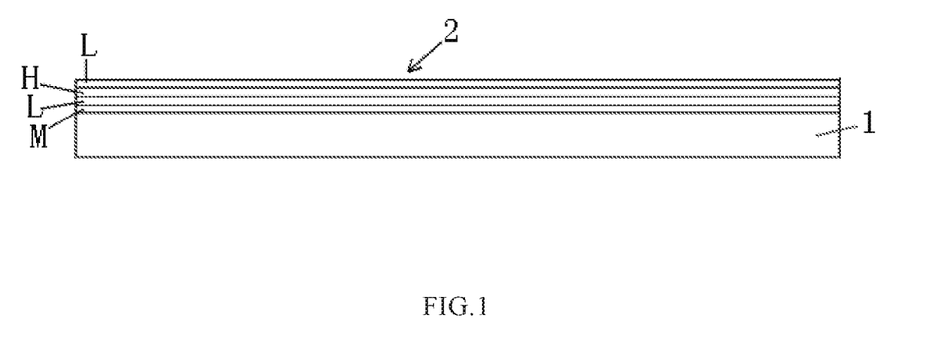
FIG. 1 is a structural view schematically showing an IR film layer according to an embodiment of the present disclosure.
Figure 2:
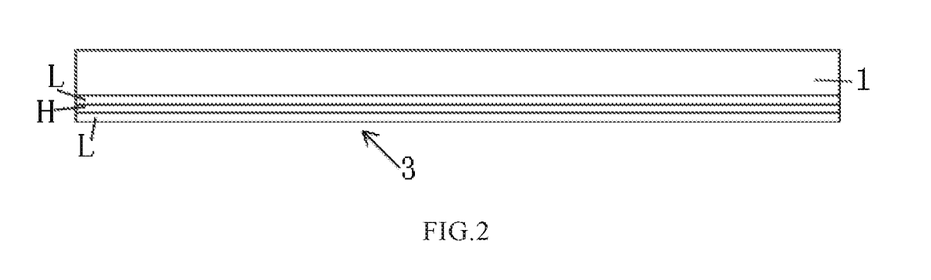
FIG. 2 is a structural view schematically showing an AR film layer according to an embodiment of the present disclosure.

FIG. 1 is a structural view schematically showing an IR film layer according to an embodiment of the present disclosure, and FIG. 2 is a structural view schematically showing an AR film layer according to an embodiment of the present disclosure. As shown in FIG. 1 and FIG. 2, an optical filter of the present disclosure includes a glass substrate 1, an IR film layer 2, and an AR film layer 3. The glass substrate 1 of the present disclosure may use D263T or AF32, the IR film layer 2 is an infrared cut-off film layer, and the AR film layer 3 is a reflection-reducing film, that is, an anti-reflection film, which can have an anti-reflection effect on wavelengths in a particular range. The IR film layer 2 and the AR film layer 3 are plated onto two opposite surfaces of the glass substrate 1, respectively. In the present embodiment, the IR film layer 2 is plated on an upper surface of the glass substrate 1, and the AR film layer 3 is plated on a lower surface of the glass substrate 1.

As shown in FIG. 1, in the present embodiment, the IR film layer 2 of the optical filter of the present disclosure includes a first refractive-index-material layer L, a third refractive-index-material layer M, and a second refractive-index-material layer H. In the present embodiment, the IR film layer 2 includes a total of four material layers, which are a third refractive-index-material layer M, a first refractive-index-material layer L, a second refractive-index-material layer H, and a first refractive-index-material layer L respectively, when viewed in a direction away from the glass substrate 1. This structure may be expressed as M, (LH), L. That is, in this embodiment, the IR film layer 2 includes a three-layer structure, i.e., the third refractive-index-material layer M plated on the upper surface of the glass substrate 1, the outermost first refractive-index-material layer L, and an intermediate material layer between the third refractive-index-material layer M and the outermost first refractive-index-material layer L, respectively. In this embodiment, the intermediate material layer includes the first refractive-index-material layer L and the second refractive-index-material layer H in sequence. The intermediate material layer of the IR film layer 2 of the present disclosure may include a plurality of first refractive-index-material layers L and a plurality of second refractive-index-material layers H alternately disposed; that is, the structure of the IR film layer 2 of the present disclosure may be expressed as M, (LH)*n, L, namely, when viewed in a direction away from the glass substrate 1, the IR film layer 2 includes the third refractive-index-material layer M, the intermediate material layer, and the first refractive-index-material layer L in sequence, and the intermediate material layer is composed of first refractive-index-material layers L and second refractive-index-material layers H alternately disposed for n times, wherein n is an integer greater than or equal to 1.

In addition, the IR film layer 2 of the present disclosure may have other embodiments in addition to the structural form of the above embodiment. In a second embodiment of the IR film layer 2 according to the present disclosure, the IR film layer 2 has a structure of (LH)*s, L, M, (LH)*p, L; that is, when viewed in a direction away from the glass substrate 1, the IR film layer 2 includes a total of five layer structures. The first layer structure is composed of first refractive-index-material layers L and second refractive-index-material layers H alternately disposed for s times, wherein s is an integer greater than or equal to 0. The second layer structure is the first refractive-index-material layer L, the third layer structure is the third refractive-index-material layer M, the fourth layer structure is composed of first refractive-index-material layers L and second refractive-index-material layers H alternately disposed for p times, wherein p is an integer greater than or equal to 1, and the fifth layer structure, i.e., the outermost layer, is the first refractive-index-material layer L.

The IR film layer 2 of the present disclosure includes the third refractive-index-material layer M, the first refractive-index-material layer L and the second refractive-index-material layer H which are arranged according to the above embodiment. With such an arrangement, the adhesion of the film layer can be effectively improved, and near-infrared light transmittance curve characteristics can be improved.

As shown in FIG. 2, the AR film layer 3 of the present disclosure is plated on the lower surface of the glass substrate 1. In this embodiment, the AR film layer 3 includes a low-refractive-index-material layer L and a high-refractive-index-material layer H. Specifically, That is, when viewed in a direction away from the glass substrate 1, the AR film layer 3 includes a first refractive-index-material layer L, a second refractive-index-material layer H, and a first refractive-index-material layer L in sequence. In this embodiment, the structure of the AR film layer 3 may be expressed as (LH), L, that is, when viewed in a direction away from the glass substrate 1, the AR film layer 3 includes a total of two layer structures, which are a first structural layer formed by the first refractive-index-material layer L and the second refractive-index-material layer H alternately plated, and the outermost first refractive-index-material layer L, respectively. In addition, the first refractive-index-material layer L and the second refractive-index-material layer H of the first structural layer in the AR film layer 3 of the present disclosure may also be alternated disposed for multiple times, that is, the structure of the AR film layer 3 may be expressed as (LH)*q, L, wherein (LH)*q represents that the first refractive-index-material layer L and the second refractive-index-material layer H are alternately disposed for q times, and q may be an integer greater than or equal to 1.

According to a second embodiment of the AR film layer 3 of the present disclosure, the structure of the AR film layer 3 is M, (LH)*k, L, that is, when viewed in a direction away from the glass substrate 1, the AR film layer 3 includes a third refractive-index-material layer M, an intermediate material layer, and a first refractive-index-material layer L in sequence. The intermediate material layer is composed of first refractive-index-material layers L and second refractive-index-material layers H alternately disposed for k times, and k is an integer greater than or equal to 1.

In addition, when the AR film layer 3 of the present disclosure includes the first refractive-index-material layer, the second refractive-index-material layer and the third refractive-index-material layer, the structure of the AR film layer 3 may also be expressed as (LH)*i, L, M, (LH)*f, L, that is, when viewed in a direction away from the glass substrate 1, the AR film layer 3 includes a total of five layer structures. The first layer structure is composed of first refractive-index-material layers L and second refractive-index-material layers H alternately disposed for i times, wherein i is an integer greater than or equal to 0. The second layer structure is the first refractive-index-material layer L, the third layer structure is the third refractive-index-material layer M, the fourth layer structure is composed of first refractive-index-material layers L and second refractive-index-material layers H alternately disposed for f times, wherein f is an integer greater than or equal to 1, and the fifth layer structure, i.e., the outermost layer, is the first refractive-index-material layer L.

The IR film layer 2 and the AR film layer 3 included in the optical filter of the present disclosure may be selected from any of the above embodiments, that is, the IR film layer 2 of the present disclosure has two embodiments, and the AR film layer 3 has three embodiments. The embodiments of the IR film layer 2 and the AR film layer 3 may be freely combined when fabricating the optical filter of the present disclosure. It should be noted that no matter which embodiment is adopted, the outermost layer of the IR film layer 2 and the outermost layer of the AR film layer 3 are both low-refractive-index-material layer.

In the optical filter of the present disclosure, the high-refractive-index material layer H involved in the IR film layer 2 is a silicon hydride layer. The silicon hydride layer is plated by a sputtering reaction during plating, wherein during plating the temperature is controlled to be in a range of 80° C.-300° C., a hydrogen flow rate is controlled to be 10-50 sccm, and a sputtering rate is controlled to be 0.1 nm/s-1 nm/s, so that the refractive index of the second refractive-index-material layer H of the present disclosure is greater than 3 in the range of 800-1200 nm and the extinction coefficient is less than 0.002, the refractive index is greater than 3.6 at 850 nm, and the refractive index is greater than 3.55 at 960 nm, which is advantageous for adjusting a shift amount of central wavelength of the passband of the optical filter according to the present disclosure. The second refractive-index-material layer H involved in the AR film layer 3 of the present disclosure may be implemented by a silicon hydride material layer or other materials, as long as it can be ensured that the refractive index of the second refractive-index-material layer is greater than that of the third refractive-index-material layer and that of the first refractive-index-material layer.

The material used for the third refractive-index-material layers M involved in the IR film layer 2 and the AR film layer 3 may be selected from one or more of $Sb_2S_3$, $Nb_2O_5$, $Ta_2O_5$, $TiO_2$, $Al_2O_3$, $ZrO_2$, $Pr_6O_{11}$, $La_2O_3$, $Si_2N$, $SiN$, $Si_2N_3$, and $Si_3N_4$, and the material used for the first refractive-index-material layers L involved in the IR film layer 2 and the AR film layer 3 may be selected from one or more of $SiO_2$, $Nb_2O_5$, $Ta_2O_5$, $TiO_2$, $Al_2O_3$, $ZrO_2$, $Pr_6O_{11}$, $La_2O_3$, $Si_2N$, $SiN$, $Si_2N_3$, and $Si_3N_4$. In a wavelength range of 800-1200 nm, the refractive index range of the third refractive-index-material layer M is less than 4, and the refractive index range of the first refractive-index-material layer L is less than 3. It is necessary to ensure that the refractive index of the third refractive-index-material layer M is greater than the refractive index of the first refractive-index-material layer L, that is, when the material of the first refractive-index-material layer L is selected from one of the foregoing materials, the material selection for the third refractive-index-material layer M should satisfy that the refractive index of the material selected for the third refractive-index-material layer is greater than the refractive index of the material selected for the first refractive-index-material layer L. The third refractive-index-material layer M and the first refractive-index-material layer L may be plated by a sputtering reaction device during plating, or may be plated by a vacuum evaporation device.

The optical filter of the present disclosure will be described in detail by means of specific examples below.

Example 1

In this embodiment, when viewed in a direction away from the glass substrate 1, the structure of the IR film layer 2 of the optical filter is M, (LH)*n, L, wherein optical thicknesses of the second refractive-index-material layer H, the third refractive-index-material layer M and the first refractive-index-material layer L are one fourth of a reference wavelength respectively, a physical thickness of the second refractive-index-material layer H and a physical thickness of the first refractive-index-material layer L satisfy a relationship: $0.05 \leq D_L/D_H \leq 20$ and a physical thickness of the third refractive-index-material layer M and the physical thickness of the second refractive-index-material layer H satisfy the relationship: $0.02 \leq D_M/D_H \leq 50$. n=11, and a total thickness of the IR film layer 2 is 3.41 μm. When viewed in a direction away from the glass substrate 1, the structure of the AR film layer 3 is (LH)*q, L, wherein q=12. The physical thickness of the second refractive-index-material layer H and the physical thickness of the low-refractive-index-material layer L satisfy a relationship: $0.05 \leq D_L/D_H \leq 20$. The physical thickness of the third refractive-index-material layer M and the physical thickness of the second refractive-index-material layer H satisfy a relationship: $0.02 \leq D_M/D_H \leq 50$.

That is, in this embodiment, the IR film layer 2 includes a total of 24 material layers, and the AR film layer 3 includes a total of 25 material layers. In this embodiment, a silicon hydride material layer is used as the second refractive-index-material layer H, alumina is used as the third refractive-index-material layer M, and silicon dioxide is used as the first refractive-index-material layer L. By using the formula $OT_i=OT(1+A \cos(2 \times pi \times f \times i)\sin(2 \times pi \times x \times i))$ and substituting into the equation $$\sum_{i=1}^{k} \begin{bmatrix} \cos\delta_i & \dfrac{i\sin\delta_i}{\eta_i} \\ i\eta_i\sin\delta_i & \cos\delta_i \end{bmatrix},$$

parameters of the film layers are obtained as shown in the following tables:

wherein $OT_i$ represents an optical thickness of the i-th film layer, $OT_0$ represents an optical thickness which is one fourth of the designed wavelength, pi represents a ratio of the circumference of a circle to its diameter, and f represents a modulation factor, which is between 0 and 1.

Table 1 shows the parameters of each material layer of the IR film layer 2:

TABLE 1

|  | 1 | 2 | 3 | 4 | 5 |
|---|---|---|---|---|---|
| material thickness (nm) | AL$_2$O$_3$ 191.86 | SiO$_2$ 264.2 | Si:H 240.21 | SiO$_2$ 122.81 | Si:H 162.65 |
|  | 6 | 7 | 8 | 9 | 10 |
| material thickness (nm) | SiO$_2$ 120.7 | Si:H 69.34 | SiO$_2$ 117.64 | Si:H 201 | SiO$_2$ 20 |
|  | 11 | 12 | 13 | 14 | 15 |
| material thickness (nm) | Si:H 115.85 | SiO$_2$ 106.32 | Si:H 216.82 | SiO$_2$ 115.94 | Si:H 242.38 |
|  | 16 | 17 | 18 | 19 | 20 |
| material thickness (nm) | SiO$_2$ 20 | Si:H 161.74 | SiO$_2$ 74.8 | Si:H 80.36 | SiO$_2$ 134.89 |
|  | 21 | 22 | 23 | 24 |  |
| material thickness (nm) | Si:H 261.68 | SiO$_2$ 72.69 | Si:H 242.21 | SiO$_2$ 71.01 |  |

Table 2 shows the parameters of each material layer of the AR film layer 3:

TABLE 2

|  | 1 | 2 | 3 | 4 | 5 |
|---|---|---|---|---|---|
| material thickness (nm) | SiO$_2$ 118.99 | Si:H 144.41 | SiO$_2$ 121.91 | Si:H 40.98 | SiO$_2$ 99.76 |
|  | 6 | 7 | 8 | 9 | 10 |
| material thickness (nm) | Si:H 38.13 | SiO$_2$ 108.77 | Si:H 46.76 | SiO$_2$ 96.72 | Si:H 40 |
|  | 11 | 12 | 13 | 14 | 15 |
| material thickness (nm) | SiO$_2$ 21 | Si:H 105 | SiO$_2$ 114.2 | Si:H 162.36 | SiO$_2$ 134.9 |
|  | 16 | 17 | 18 | 19 | 20 |
| material thickness (nm) | Si:H 20 | SiO$_2$ 20 | Si:H 20 | SiO$_2$ 86.73 | Si:H 41.24 |
|  | 21 | 22 | 23 | 24 | 25 |
| material thickness (nm) | SiO$_2$ 117.94 | Si:H 60.05 | SiO$_2$ 45.65 | Si:H 53.89 | SiO$_2$ 139.6 |

Figure 3:
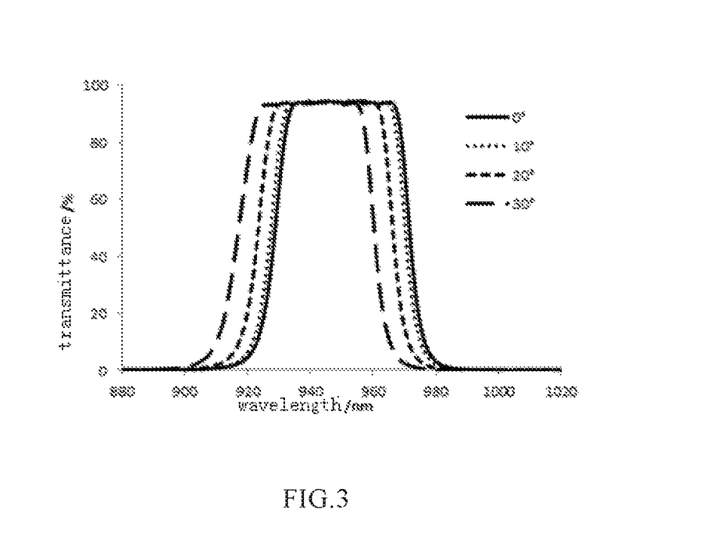
FIG. 3 is a curve graph schematically showing a light wavelength transmittance of the IR film layer in a first embodiment.

As shown in FIG. 3, the optical filter of the present disclosure is set with reference to various conditional parameters in Example 1. In the wavelength range of 800-1200 nm, the IR film layer 2 of the present disclosure has one pass-band wave band, two cut-off wave bands, and two transition wave bands, that is, when viewed in a direction from 800 nm to 1200 nm, the IR film layer 2 has a cut-off wave band, a transition wave band, a pass-band wave band, a transition wave band, and a cut-off wave band in sequence. The pass-band wave band refers to a band through which light can pass, the cut-off wave band refers to a band through which light cannot pass, and the transition wave band is located between the cut-off wave band and the pass-band wave band. As shown in the figure, the pass-band wave band has a width less than 400 nm and a transmittance greater than 90%, the transition wave band has a transmittance of 0.1%-90%, and the cut-off wave band has a transmittance less than 0.1%.

Figure 4:
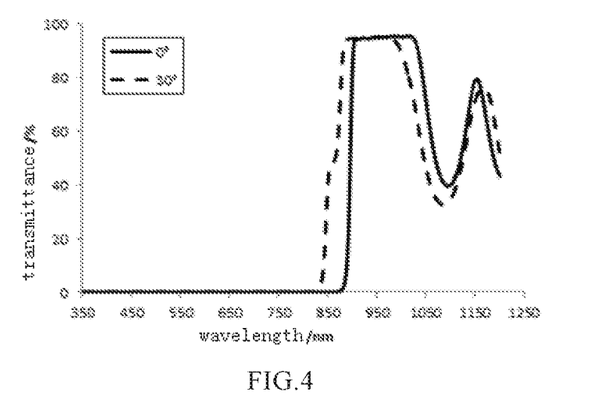
FIG. 4 is a curve graph schematically showing a light wavelength transmittance of the AR film layer in the first embodiment.

As shown in FIG. 4, the AR film layer 3 of the optical filter of the present disclosure is set with reference to various conditional parameters in Example 1. In the wavelength range of 350-1200 nm, the AR film layer 3 has one pass-band wave band, one cut-off wave band, and one transition wave band, that is, when viewed in a direction from 350 nm to 1200 nm, the AR film layer 3 has a cut-off wave band, a transition wave band, and a pass-band wave band in sequence. As shown in FIG. 4, the pass-band wave band has a transmittance greater than 90%, the transition wave band has a transmittance of 0.1%-90%, and the cut-off wave band has a transmittance less than 0.1%.

By setting the optical filter of the present disclosure according to the parameters of Example 1, it can be ensured that a full width at half maximum (FWHM) value of the optical filter of the present disclosure is less than 120 nm, a total thickness of the IR film layer 2 and the AR film layer 3 is less than 9.8 μm, and when an incident angle is changed from 0° to 30°, a shift amount of central wavelength of the passband of the optical filter is less than 20 nm.

Example 2

In this embodiment, when viewed in a direction away from the glass substrate 1, the structure of the IR film layer 2 of the optical filter is (LH)*s, L, M, (LH)*p, L, wherein optical thicknesses of the second refractive-index-material layer H, the third refractive-index-material layer M and the first refractive-index-material layer L are one fourth of a reference wavelength respectively, a physical thickness of the second refractive-index-material layer H and a physical thickness of the first refractive-index-material layer L satisfy a relationship: $0.05 \leq D_L/D_H \leq 20$ and a physical thickness of the third refractive-index-material layer M and the physical thickness of the second refractive-index-material layer H satisfy the relationship: $0.02 \, D_M/D_H \leq 50$. s=5, p=6, and a total thickness of the IR film layer 2 is 3.2 μm. When viewed in a direction away from the glass substrate 1, the structure of the AR film layer 3 is (LH)*q, L, wherein q=12. The physical thickness of the second refractive-index-material layer H and the physical thickness of the low-refractive-index-material layer L satisfy a relationship: $0.05 \leq D_L/D_H \leq 20$. The physical thickness of the third refractive-index-material layer M and the physical thickness of the second refractive-index-material layer H satisfy a relationship: $0.02 \leq D_M/D_H \leq 50$.

That is, in this embodiment, the IR film layer 2 includes a total of 25 material layers, and the AR film layer 3 includes a total of 25 material layers. In this embodiment, a silicon hydride material layer is used as the second refractive-index-material layer H of the IR film layer 2, alumina is used as the third refractive-index-material layer M, and silicon dioxide is used as the first refractive-index-material layer L. In the AR film layer 3, Nb$_2$O$_5$ is used as the second refractive-index-material layer, and silicon dioxide is used as the first refractive-index-material layer L. By using the formula $OT_i = OT(1 + A \cos(2 \times pi \times f \times i)) \sin(2 \times pi \times f \times i)$ and substituting into the equation $$\sum_{i=1}^{k}\begin{bmatrix} \cos\delta_i & \dfrac{i\sin\delta_i}{\eta_i} \\ i\eta_i\sin\delta_i & \cos\delta_i \end{bmatrix},$$

parameters of the film layers are obtained as shown in the following tables:

Table 3 shows the parameters of each material layer of the IR film layer 2:

TABLE 3

| | 1 | 2 | 3 | 4 | 5 |
|---|---|---|---|---|---|
| material | SiO$_2$ | Si:H | SiO$_2$ | Si:H | SiO$_2$ |
| thickness (nm) | 216.82 | 241.04 | 157.35 | 258.55 | 110.97 |
| | 6 | 7 | 8 | 9 | 10 |
| material | Si:H | SiO$_2$ | Si:H | SiO$_2$ | Si:H |
| thickness (nm) | 72.68 | 110.1 | 281.69 | 31.92 | 105.95 |
| | 11 | 12 | 13 | 14 | 15 |
| material | SiO$_2$ | AL$_2$O$_3$ | SiO$_2$ | Si:H | SiO$_2$ |
| thickness (nm) | 115.24 | 269.55 | 20 | 229.1 | 85.05 |
| | 16 | 17 | 18 | 19 | 20 |
| material | Si:H | SiO$_2$ | Si:H | SiO$_2$ | Si:H |
| thickness (nm) | 244.25 | 20 | 163.62 | 80.54 | 70.93 |
| | 21 | 22 | 23 | 24 | 25 |
| material | SiO$_2$ | Si:H | SiO$_2$ | Si:H | SiO$_2$ |
| thickness (nm) | 141.73 | 265.31 | 72.69 | 235.3 | 92.66 |

Table 4 shows the parameters of each material layer of the AR film layer 3:

TABLE 4

| | 1 | 2 | 3 | 4 | 5 |
|---|---|---|---|---|---|
| material | SiO$_2$ | Nb$_2$O$_5$ | SiO$_2$ | Nb$_2$O$_5$ | SiO$_2$ |
| thickness (nm) | 177.36 | 29.01 | 86.24 | 34.26 | 137.61 |
| | 6 | 7 | 8 | 9 | 10 |
| material | Nb$_2$O$_5$ | SiO$_2$ | Nb$_2$O$_5$ | SiO$_2$ | Nb$_2$O$_5$ |
| thickness (nm) | 42.57 | 105.57 | 32.63 | 124.57 | 39.38 |
| | 11 | 12 | 13 | 14 | 15 |
| material | SiO$_2$ | Nb$_2$O$_5$ | SiO$_2$ | Nb$_2$O$_5$ | SiO$_2$ |
| thickness (nm) | 127.56 | 36.38 | 121.12 | 36.38 | 123.16 |
| | 16 | 17 | 18 | 19 | 20 |
| material | Nb$_2$O$_5$ | SiO$_2$ | Nb$_2$O$_5$ | SiO$_2$ | Nb$_2$O$_5$ |
| thickness (nm) | 31.7 | 132.74 | 44.2 | 128.03 | 27.69 |
| | 21 | 22 | 23 | 24 | 25 |
| material | SiO$_2$ | Nb$_2$O$_5$ | SiO$_2$ | Nb$_2$O$_5$ | SiO$_2$ |
| thickness (nm) | 110.12 | 44.01 | 131.96 | 36.76 | 76.98 |

Figure 5:
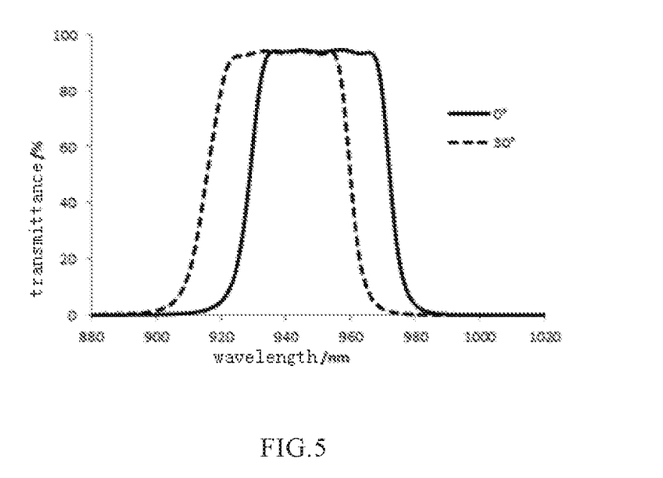
FIG. 5 is a curve graph schematically showing a light wavelength transmittance of the IR film layer in a second embodiment.

As shown in FIG. 5, the optical filter of the present disclosure is set with reference to various conditional parameters in Example 2. In the wavelength range of 800-1200 nm, the IR film layer 2 of the present disclosure has one pass-band wave band, two cut-off wave bands, and two transition wave bands, that is, when viewed in a direction from 800 nm to 1200 nm, the IR film layer 2 has a cut-off wave band, a transition wave band, a pass-band wave band, a transition wave band, and a cut-off wave band in sequence. The pass-band wave band refers to a band through which light can pass, the cut-off wave band refers to a band through which light cannot pass, and the transition wave band is located between the cut-off wave band and the pass-band wave band. As shown in the figure, the pass-band wave band has a width less than 400 nm and a transmittance greater than 90%, the transition wave band has a transmittance of 0.1%-90%, and the cut-off wave band has a transmittance less than 0.1%.

Figure 6:
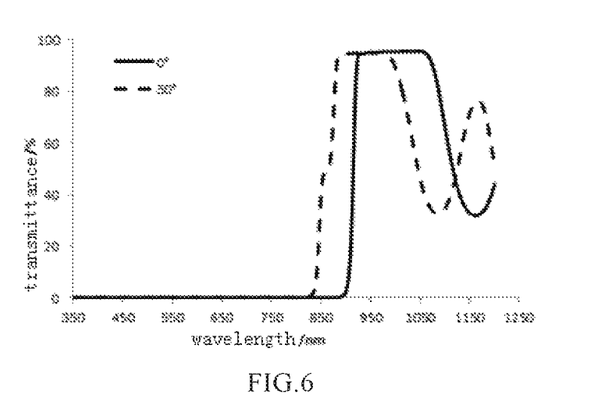
FIG. 6 is a curve graph schematically showing a light wavelength transmittance of the AR film layer in the second embodiment.

As shown in FIG. 6, the AR film layer 3 of the optical filter of the present disclosure is set with reference to various conditional parameters in Example 2. In the wavelength range of 350-1200 nm, the AR film layer 3 has one pass-band wave band, one cut-off wave band, and one transition wave band, that is, when viewed in a direction from 350 nm to 1200 nm, the AR film layer 3 has a cut-off wave band, a transition wave band, and a pass-band wave band in sequence. As shown in FIG. 6, the pass-band wave band has a transmittance greater than 90%, the transition wave band has a transmittance of 0.1%-90%, and the cut-off wave band has a transmittance less than 0.1%.

By setting the optical filter of the present disclosure according to the parameters of Example 2, it can also be ensured that a full width at half maximum (FWHM) value of the optical filter of the present disclosure is less than 120 nm, a total thickness of the IR film layer 2 and the AR film layer 3 is less than 9.8 μm, and when an incident angle is changed from 0° to 30°, a shift amount of central wavelength of the passband of the optical filter is less than 20 nm.

Example 3

In this embodiment, when viewed in a direction away from the glass substrate 1, the structure of the IR film layer 2 of the optical filter is M, (LH)*n, L, wherein optical thicknesses of the second refractive-index-material layer H, the third refractive-index-material layer M and the first refractive-index-material layer L are one fourth of a reference wavelength respectively, a physical thickness of the second refractive-index-material layer H and a physical thickness of the first refractive-index-material layer L satisfy a relationship: $0.05 \leq D_L/D_H \leq 20$, and a physical thickness of the third refractive-index-material layer M and the physical thickness of the second refractive-index-material layer H satisfy the relationship: $0.02 \leq D_M/D_H \leq 50$. n=11, a total thickness of the IR film layer 2 is 4.64 μm. When viewed in a direction away from the glass substrate 1, the structure of the AR film layer 3 is (LH)*q, L, wherein q=12. The physical thickness of the second refractive-index-material layer H and the physical thickness of the low-refractive-index-material layer L satisfy a relationship: $0.05 \leq D_L/D_H \leq 20$. The physical thickness of the third refractive-index-material layer M and the physical thickness of the second refractive-index-material layer H satisfy a relationship: $0.02 \leq D_M/D_H \leq 50$.

That is, in this embodiment, the IR film layer 2 includes a total of 24 material layers, and the AR film layer 3 includes a total of 25 material layers. In this embodiment, in the IR film layer 2, silicon hydride is used as the second refractive-index-material layer H, Nb$_2$O$_5$ is used as the third refractive-index-material layer M, and silicon dioxide is used as the first refractive-index-material layer L. In the AR film layer 3, silicon hydride is used as the second refractive-index-material layer H, and silicon dioxide is used as the first refractive-index-material layer L. By using the formula OT$_i$=OT(1+A cos(2×pi×1×i)sin (2×pi×x×i)) and substituting into the equation $$\sum_{i=1}^{k}\begin{bmatrix} \cos\delta_i & \dfrac{i\sin\delta_i}{\eta_i} \\ i\eta_i\sin\delta_i & \cos\delta_i \end{bmatrix},$$

parameters of the film layers are obtained as shown in the following tables:

Table 5 shows the parameters of each material layer of the IR film layer 2:

TABLE 5

| | 1 | 2 | 3 | 4 | 5 |
|---|---|---|---|---|---|
| material thickness (nm) | Nb$_2$O$_5$ 69.22 | SiO$_2$ 92.9 | Si:H 289.82 | SiO$_2$ 110.55 | Si:H 150.69 |
| | 6 | 7 | 8 | 9 | 10 |
| material thickness (nm) | SiO$_2$ 180.07 | Si:H 249 | SiO$_2$ 47.65 | Si:H 274.33 | SiO$_2$ 140.68 |
| | 11 | 12 | 13 | 14 | 15 |
| material thickness (nm) | Si:H 285 | SiO$_2$ 168.38 | Si:H 450 | SiO$_2$ 135.93 | Si:H 231 |
| | 16 | 17 | 18 | 19 | 20 |
| material thickness (nm) | SiO$_2$ 64.56 | Si:H 268.44 | SiO$_2$ 88.3 | Si:H 380 | SiO$_2$ 128.53 |
| | 21 | 22 | 23 | 24 | |
| material thickness (nm) | Si:H 210 | SiO$_2$ 65 | Si:H 311 | SiO$_2$ 243.3 | |

Table 6 shows the parameters of each material layer of the AR film layer 3:

TABLE 6

| | 1 | 2 | 3 | 4 | 5 |
|---|---|---|---|---|---|
| material thickness (nm) | SiO$_2$ 118.99 | Si:H 144.41 | SiO$_2$ 121.91 | Si:H 40.98 | SiO$_2$ 99.76 |
| | 6 | 7 | 8 | 9 | 10 |
| material thickness (nm) | Si:H 38.13 | SiO$_2$ 108.77 | SiO$_2$ 46.76 | SiO$_2$ 96.72 | Si:H 40 |
| | 11 | 12 | 13 | 14 | 15 |
| material thickness (nm) | SiO$_2$ 21 | Si:H 105 | SiO$_2$ 114.2 | Si:H 162.36 | SiO$_2$ 134.9 |
| | 16 | 17 | 18 | 19 | 20 |
| material thickness (nm) | Si:H 20 | SiO$_2$ 20 | Si:H 20 | SiO$_2$ 86.73 | Si:H 41.24 |
| | 21 | 22 | 23 | 24 | 25 |
| material thickness (nm) | SiO$_2$ 117.94 | Si:H 60.05 | SiO$_2$ 45.65 | Si:H 53.89 | SiO$_2$ 139.6 |

Figure 7:
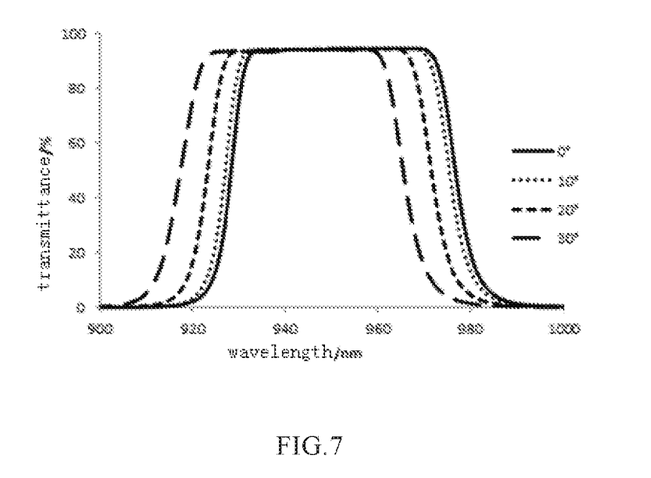
FIG. 7 is a curve graph schematically showing a light wavelength transmittance of the IR film layer in a third embodiment.

As shown in FIG. 7, the optical filter of the present disclosure is set with reference to various conditional parameters in Example 3. In the wavelength range of 800-1200 nm, the IR film layer 2 of the present disclosure has one pass-band wave band, two cut-off wave bands, and two transition wave bands, that is, when viewed in a direction from 800 nm to 1200 nm, the IR film layer 2 has a cut-off wave band, a transition wave band, a pass-band wave band, a transition wave band, and a cut-off wave band in sequence. The pass-band wave band refers to a band through which light can pass, the cut-off wave band refers to a band through which light cannot pass, and the transition wave band is located between the cut-off wave band and the pass-band wave band. As shown in the figure, the pass-band wave band has a width less than 400 nm and a transmittance greater than 90%, the transition wave band has a transmittance of 0.1%-90%, and the cut-off wave band has a transmittance less than 0.1%.

Figure 8:
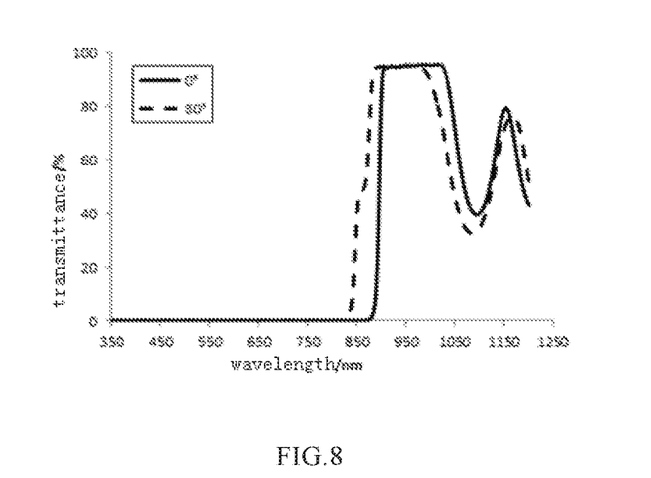
FIG. 8 is a curve graph schematically showing a light wavelength transmittance of the AR film layer in the third embodiment.

As shown in FIG. 8, the AR film layer 3 of the optical filter of the present disclosure is set with reference to various conditional parameters in Example 3. In the wavelength range of 350-1200 nm, the AR film layer 3 has one pass-band wave band, one cut-off wave band, and one transition wave band, that is, when viewed in a direction from 350 nm to 1200 nm, the AR film layer 3 has a cut-off wave band, a transition wave band, and a pass-band wave band in sequence. As shown in FIG. 8, the pass-band wave band has a transmittance greater than 90%, the transition wave band has a transmittance of 0.1%-90%, and the cut-off wave band has a transmittance less than 0.1%.

By setting the optical filter of the present disclosure according to the parameters of Example 3, it can also be ensured that a full width at half maximum (FWHM) value of the optical filter of the present disclosure is less than 120 nm, a total thickness of the IR film layer 2 and the AR film layer is less than 9.8 μm, and when an incident angle is changed from 0° to 30°, a shift amount of central wavelength of the passband of the optical filter is less than 20 nm.

By disposing the IR film layer 2 and the AR film layer 3 in the optical filter of the present disclosure in the manner described above, at the same time of effectively ensuring a high transmittance of near-infrared light, a shift amount of the central wavelength of the passband of the optical filter with angle can be controlled below 20 nm. In addition, since third refractive-index-material layers M are disposed in the IR film layer 2 and the AR film layer 3 and arranged according to the manner described above, the total thickness of the film layers of the optical filter of the present disclosure is effectively reduced, and at the same time, adhesion of the film layers can be improved.

Figure 9:
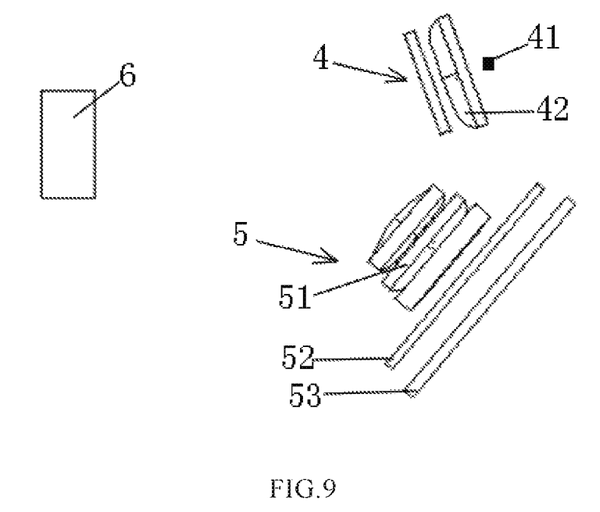
FIG. 9 is a structural view schematically showing an infrared image sensing system including the optical filter of the present disclosure.

The present disclosure also provides an infrared image sensing system including the optical filter of the present disclosure. FIG. 9 is a structural view schematically showing an infrared image sensing system including the optical filter of the present disclosure. As shown in FIG. 9, the infrared image sensing system of the present disclosure includes a light source unit 4 and a receiving unit 5. In the present embodiment, the light source unit 4 includes an IR emission light source 41 and a first lens assembly 42. The receiving unit 5 includes a second lens assembly 51, the optical filter of the present disclosure, and an infrared image sensor 53. In this embodiment, the IR light source 41 may be a Vertical-Cavity Surface-Emitting Laser (VCSEL), a LD, or a LED. The first lens assembly 42 includes a near-infrared light collimating lens and an optical diffraction element. The second lens assembly 51 may be a common optical lens. A work flow of the infrared image sensing system of the present disclosure is described as follows:

the IR light source 41 is turned on, and light is projected to a face/hand 6 after being collimated by the first lens assembly 42; the second lens assembly 51 shoots an image, and a 3D image is generated after the infrared image sensor 53 performs an algorithm calculation for face recognition or gesture recognition. Due to the existence of the optical filter 52 of the present disclosure, near-infrared light can be anti-reflected and light of other wavelength bands can be cut off during the shooting, thereby improving the accuracy of final face recognition and gesture recognition.

The above described is only one solution of the present disclosure, and is not intended to limit the present disclosure. For those skilled in the art, various modifications and changes can be made to the present disclosure. Any modifications, equivalent substitutions, improvements or the like made within the spirit and scope of the present disclosure are intended to be included in the scope of protection of the present disclosure.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An optical filter, comprising: a glass substrate (1), and an IR film layer (2) and an AR film layer (3) plated on two opposite surfaces of the glass substrate,
   wherein the IR film layer (2) is a near-infrared band-pass film layer for passing near-infrared light, and the AR film layer (3) is a near-infrared reflection-reducing film layer for anti-reflecting near-infrared light,
   the IR film layer (2) comprises at least two first refractive-index-material layers, at least one second refractive-index-material layer, and a single third refractive-index-material layer; and
   for a wavelength within a wavelength range of 800-1200 nm, the refractive index of the third refractive-index-material layer is greater than the refractive index of the first refractive-index-material layer, and the refractive index of the second refractive-index-material layer is greater than the refractive index of the third refractive-index-material layer.

2. The optical filter according to claim 1, wherein the AR film layer (3) comprises at least two first refractive-index-material layer and at least one second refractive-index-material layer, or comprises at least two first refractive-index-material layer, at least one second refractive-index-material layer, and a single third refractive-index-material layer.

3. The optical filter according to claim 2, wherein when viewed in a direction away from the glass substrate (1), compositions of the AR film layer (3) are (LH)*q and L in sequence, wherein L represents the first refractive-index-material layer, H represents the second refractive-index-material layer, (LH)*q represents that the first refractive-index-material layer and the second refractive-index-material layer are alternately disposed for q times, and q is an integer greater than or equal to 1.

4. The optical filter according to claim 2, wherein when viewed in a direction away from the glass substrate (1), compositions of the AR film layer (3) are M, (LH)*k and L in sequence, wherein M represents the third refractive-index-material layer, L represents a low-refractive-index-material layer, H represents the second refractive-index-material layer, (LH)*k represents that the first refractive-index-material layer and the second refractive-index-material layer are alternately disposed for k times, and k is an integer greater than or equal to 1.

5. The optical filter according to claim 2, wherein when viewed in a direction away from the glass substrate (1), compositions of the AR film layer (3) are (LH)*i, L, M, (LH)*f and L in sequence, wherein M represents the third refractive-index-material layer, L represents the first refractive-index-material layer, H represents the second refractive-index-material layer, (LH)*i represents that the first refractive-index-material layer and the second refractive-index-material layer are alternately disposed for i times, i is an integer greater than or equal to 0, (LH)*f represents that the first refractive-index-material layer and the second refractive-index-material layer are alternately disposed for f times, and f is an integer greater than or equal to 1.

6. The optical filter according to claim 1, wherein when viewed in a direction away from the glass substrate (1), an outermost layer of the IR film layer (2) and an outermost layer of the AR film layer (3) are each composed of a first refractive-index-material.

7. The optical filter according to claim 6, wherein when viewed in a direction away from the glass substrate (1), compositions of the IR film layer (2) are M, (LH)*n and L in sequence, wherein M represents the third refractive-index-material layer, L represents the first refractive-index-material layer, H represents the second refractive-index-material layer, (LH)*n represents that the first refractive-index-material layer and the second refractive-index-material layer are alternately disposed for n times, and n is an integer greater than or equal to 1.

8. The optical filter according to claim 6, wherein when viewed in a direction away from the glass substrate (1), compositions of the IR film layer (2) are (LH)*s, L, M, (LH)*p and L in sequence, wherein M represents the third refractive-index-material layer, L represents the first refractive-index-material layer, H represents the second refractive-index-material layer, (LH)*s represents that the first refractive-index-material layer and the second refractive-index-material layer are alternately disposed for s times, s is an integer greater than or equal to 0, (LH)*p represents that the first refractive-index-material layer and the second refractive-index-material layer are alternately disposed for p times, and p is an integer greater than or equal to 1.

9. The optical filter according to claim 6, wherein a physical thickness of the second refractive-index-material layer and a physical thickness of the first refractive-index-material layer satisfy a relationship: $0.05 \leq D_L/D_H \leq 20$, and a physical thickness of the third refractive-index-material layer and the physical thickness of the second refractive-index-material layer satisfy a relationship: $0.02 \leq D_M/D_H \leq 50$.

10. The optical filter according to claim 1, wherein the second refractive-index-material layer of the IR film layer (2) is a silicon hydride layer, the refractive index in the wavelength range of 800-1200 nm is greater than 3, and an extinction coefficient is less than 0.002; and the second refractive-index-material layer has a refractive index greater than 3.6 at 850 nm and a refractive index greater than 3.55 at 940 nm.

11. The optical filter according to claim 1, wherein in the wavelength range of 800-1200 nm, the refractive index of the third refractive-index-material layer is less than 4, and the refractive index of the first refractive-index-material layer is less than 3.

12. The optical filter according to claim 1, wherein the IR film layer (2) has one pass-band wave band, two cut-off wave bands, and two transition wave bands in the wavelength range of 800-1200 nm, the two transition wave bands are located on two sides of the pass-band wave band respectively, and the two cut-off wave bands are located on an outer side of the two transition wave bands respectively;

the pass-band wave band has a width less than 400 nm, and a transmittance greater than 90%;

the transition wave bands have a transmittance of 0.1%-90%; and the cut-off wave bands have a transmittance less than 0.1%.

13. The optical filter according to claim 1, wherein the AR film layer (3) has one pass-band wave band, one cut-off wave band, and one transition wave band in a wavelength range of 350-1200 nm, and the cut-off wave band, the transition wave band and the pass-band wave band are arranged in sequence in a direction from 350 nm to 1200 nm;

the pass-band wave band has a transmittance greater than 90%;

the transition wave band has a transmittance of 0.1%-90%; and the cut-off wave band has a transmittance less than 0.1%.

14. The optical filter according to claim 1, wherein a full width at half maximum (FWHM) value of the optical filter is less than 120 nm, and a total thickness of the IR film layer (2) and the AR film layer (3) is less than 9.8 μm.

15. The optical filter according to claim 1, wherein when an incident angle is changed from 0° to 30°, a shift amount of central wavelength of the passband of the optical filter is less than 20 nm.

16. An infrared image sensing system comprising the optical filter according to claim 1, wherein the infrared image sensing system comprises a light source unit (4) and a receiving unit (5), the light source unit (4) comprises an IR emission light source (41) and a first lens assembly (42); and the receiving unit (5) comprises a second lens assembly (51), the optical filter (52), and an infrared image sensor (53).

\* \* \* \* \*